United States Patent [19]

Loeber et al.

[11] Patent Number: 4,863,147

[45] Date of Patent: Sep. 5, 1989

[54] VEHICLE N2/OIL SUSPENSION WITH EXTERNAL DAMPING ORIFICE ADJUSTMENT

[75] Inventors: Frederick W. Loeber, Tulsa, Okla.; Richard L. Hoffelmeyer, Longview, Tex.; Jeffrey A. Jackson, Kellyville, Okla.

[73] Assignee: Unit Rig, Inc., Tulsa, Okla.

[21] Appl. No.: 206,115

[22] Filed: Jun. 13, 1988

Related U.S. Application Data

[63] Continuation-in-part of Ser. No. 50,414, May 18, 1987, abandoned.

[51] Int. Cl.[4] ............ F16F 5/00; F16F 9/06; F16F 9/36; F16F 9/44
[52] U.S. Cl. ............ 267/64.26; 267/220; 188/321.11; 188/322.15; 188/319
[58] Field of Search ........ 188/321.11, 322.21, 188/322.17, 322.19, 269, 299, 315, 317, 322.15, 319; 267/219, 220, 140.5, 141.2, 64.26, 64.28, 150, 35, 141, 64.11, 64.15; 280/707

[56] References Cited

U.S. PATENT DOCUMENTS

| | | | |
|---|---|---|---|
| 1,574,000 | 2/1926 | Roberts . | |
| 2,356,481 | 8/1944 | Thornhill | 267/64 |
| 2,367,220 | 1/1945 | Knox | 267/64.11 X |
| 2,721,074 | 10/1955 | De Carbon | 267/64 |
| 2,774,446 | 12/1956 | De Carbon | 188/88 |
| 3,201,112 | 8/1965 | Wossner | 267/64 |
| 3,265,163 | 8/1966 | Gilbert et al. | 188/88 |
| 3,300,202 | 1/1967 | Vinton | 267/64.11 X |
| 3,647,239 | 3/1972 | Katsumori | 280/124 F |
| 3,711,080 | 1/1973 | Kendall | 267/116 |
| 3,765,406 | 7/1904 | Wagenhorst | 188/317 X |
| 3,804,216 | 4/1974 | Katsumori et al. | 188/317 X |
| 3,856,287 | 12/1974 | Freltag | 267/64 R |

FOREIGN PATENT DOCUMENTS

| | | | |
|---|---|---|---|
| 0462424 | 3/1951 | Italy | 188/319 |
| 0151408 | 9/1982 | Japan | 188/321.11 |
| 0166508 | 8/1985 | Japan | 267/35 |
| 6716671 | 6/1968 | Netherlands | 188/321.11 |
| 1099142 | 6/1984 | U.S.S.R. | 267/64.28 |
| 1099144 | 6/1984 | U.S.S.R. | 267/64.28 |
| 0562677 | 7/1944 | United Kingdom | 267/64.26 |

Primary Examiner—Andres Kashnikow
Assistant Examiner—Richard Potosnak
Attorney, Agent, or Firm—Head & Johnson

[57] ABSTRACT

This is a suspension system for use on a vehicle between an axle and a load carrying body. It includes a plunger tube which is attached to the axle of the vehicle. The plunger tube extends upwardly into the annulus between an outer cylindrical housing, which is secured to the frame of the vehicle, and an interior piston rod. There is a main cavity within the piston rod and an annular cavity between the piston rod and the plunger tube. At least one orifice extends through the piston rod to permit fluid communication between the main cavity within the piston rod and the annular cavity. A second passage therebetween includes a ball check valve which permits flow of fluid only from the main cavity to the annular cavity. A movable orifice metering ring can be raised or lowered from the exterior of the suspension system to vary the size of the orifice between the main cavity and the annular cavity. An elastomeric alignment assembly connects the top of the piston rod to the outer cylindrical housing to compensate for wear of bushings between the piston rod and plunger tube.

2 Claims, 2 Drawing Sheets

VEHICLE N2/OIL SUSPENSION WITH EXTERNAL DAMPING ORIFICE ADJUSTMENT

CROSS REFERENCE TO RELATED APPLICATION

This application is a continuation-in-part of my co-pending application Ser. No. 50,414, filed May 18, 1987, now abandoned, and entitled "Vehicle N$_2$/Oil Suspension with External Damping Orifice Adjustment".

BACKGROUND OF THE INVENTION

This invention relates to a suspension system for use on a vehicle and is installed between an axle and a load carrying body.

Suspension struts are used to support the load bearing portion of a truck from its axle. One important strut system uses a gas over oil. The gas is highly compressible and the oil is essentially non-compressible. An outer tube is fixed or connected to the body or frame of the truck. Positioned inside the outer tube is a hollow piston rod. An annular space is provided between the outer tube and the piston rod. A plunger tube, which is connected to the axle of the truck, extends upwardly into this annular space between the piston rod and the outer tube. An oil is injected into the bottom portion of the main cavity within the piston rod and flows through ports in the lower end of the piston rod to an annular cavity between the piston rod and the inner wall of the plunger tube. A check valve also permits flow from its main chamber into the annular cavity but stops the flow in the opposite direction. A gas which is normally nitrogen is injected under pressure above the oil. This gas/oil combination can be called a gas spring.

As the outer tube moves down with respect to the axle due to heavy loads being carried by the vehicle, the volume of the main cavity decreases thus forcing oil out through the port and into the annular cavity and the gas is compressed to a rather high degree.

It is important for the oil to flow as free as possible into the annular cavity to prevent cavitation or a negative pressure on the oil. The primary problem of the negative pressure is the seal's inability to handle this reverse pressure. The result is air and particulate contamination are allowed to enter the normally closed environment. The air can radically change the operating characteristic of the system while the particulate contamination can shorten the operating life.

When the load on the suspension decreases, the outer tube moves up with respect to the plunger tube forcing oil to flow from the annular cavity only through the port means into the main cavity. This can be called the rebound stroke of the suspension. This rebound stroke is dampened by the restriction created by the port means to prevent rapid cycling of the suspension system.

It is virtually impossible to calculate the size port which will give the proper operating functions for the suspension system to obtain the optimum damping action. Therefore, typically what is done is to assemble the suspension with a selected port size. The truck is then operated under a specific set of load conditions. The suspension is then disassembled and reassembled with a different port size. The truck is again operated under the same load conditions. This is repeated until an optimum port size is found for the tested load condition. However, due to changes in operating parameters, the operating conditions change. It is very impractical to change or tune the porting with these changing operating conditions. Therefore, optimum damping is lost.

Proper alignment between the piston rod and the plunger tube is very important. There are bushings or bearings between the outer tube and the plunger tube and these must be properly sized.

SUMMARY OF THE INVENTION

This is a suspension system for use on a vehicle between an axle and a load carrying body. It includes basically an upper part which is fixed to the frame of the load carrying body and a lower portion which is fixed to the axle casting. The two portions move with respect to each other in accordance with loading conditions. The upper portion includes an outer tube and a hollow piston rod inside an outer tube with an annular space therebetween. A piston head is attached to the lower end of the piston rod. A plunger tube which is fixed to the axle casting extends up into this annular space between the piston rod and the outer tube. The piston head extends outwardly into sealing contact with the inner wall of the plunger tube and an annular cavity is formed just above the piston head between the outer wall of the piston rod and the inner wall of the plunger tube. The volume of this annular cavity varies as the plunger tube moves with respect to the piston rod and piston head. Within the piston rod is a main cavity. A first port means extends through the wall of the piston rod to establish a fluid flow path between the main cavity and the annular cavity. A second port means is also provided through the wall of the piston rod to establish a fluid path between the main cavity and the annular cavity. However, in this instance there is a check valve in the second port means which permits flow of fluid only from the main cavity to the annular cavity and blocks any return flow through this second port means.

When there is a heavy load on the suspension system the plunger tube enters further into the annular space of the outer tube and piston rod. This increases the volume of the annular cavity between the piston rod and plunger tube but decreases the volume of the main cavity. The annular cavity and the lower portion of the main cavity are filled with oil while the upper portion of the main cavity is filled with a gas, normally nitrogen. Oil flows freely through the port means and check valve into the annular cavity and the nitrogen is highly compressed.

When the load is reduced on the suspension system the upper portion and the lower portion extend with respect to each other. This decreases the volume of the annular cavity and fluid flows out through the port means but not through the check valve. This restricted flow provides a dampening effect. However, we have found that it is most difficult to size this port means so we have provided a means whereby the effective area of the port means can be adjusted from external of the suspension system. This includes a orifice metering ring which in one position is clear of the orifice so the orifice is unobstructed. In other positions the metering ring will cover progressively more of the area. The metering ring is supported by a slender tubular member which is connected at the upper end to a stem member having threads which engage threads on the cap of the upper portion and extends therethrough. The stem portion has a flat portion exterior of the suspension system so that a wrench may be used to rotate the stem member. By rotating this, one can raise or lower the position of the orifice metering ring which is attached to the lower end of the slender tubular member. Thus, one can adjust the effective area of the port means. For any given operating condition one can adjust the position of the orifice metering ring until acceptable dampening is obtained.

We have special means to assure continued alignment of the piston rod with the plunger tube. A special connection means is provided between the upper end of the piston rod and the upper end of the outer tube which permits alignment of the piston rod with the plunger tube. A cushion pad assembly is used to connect the upper end of the piston rod to the upper end of the outer tube. When one of the bushings wears between the outer tube and the plunger tube the wear will cause a slight axial misalignment. By use of the cushion pad assembly the piston rod will be able to rotate and shift slightly laterally so that it can still maintain proper alignment with the plunger tube. This will prevent binding and excessive wear.

It is thus an object of this invention to provide means which will automatically permit proper alignment of the piston rod within the plunger tube after wear of the bushings between the outer tube and the plunger tube.

DETAILED DESCRIPTION OF THE PREFERRED EMBODIMENT

Figure 1:
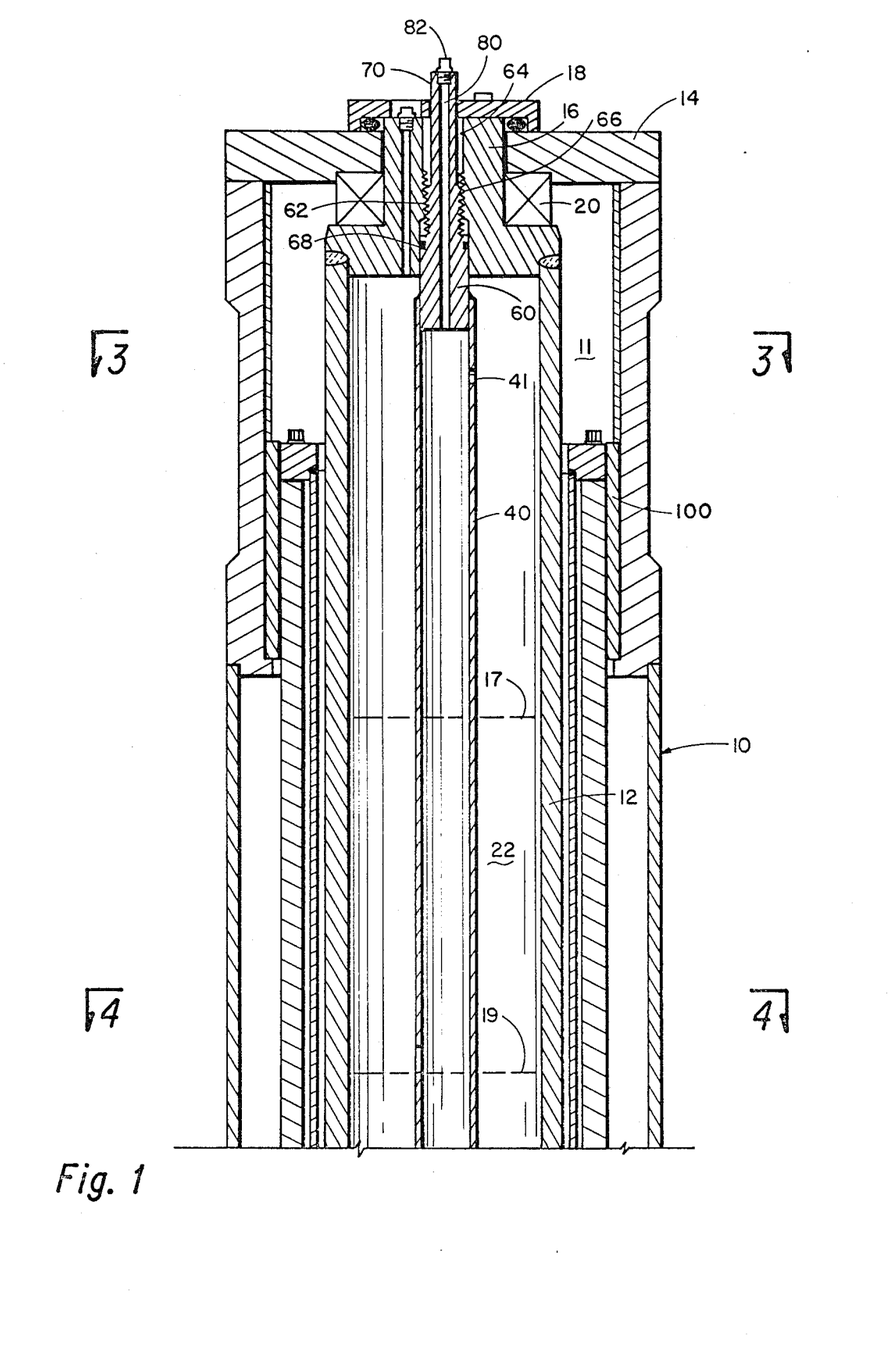
FIG. 1 and FIG. 2 when taken together show, in cross section, the invention with FIG. 1 being the top portion which attaches to the truck frame and FIG. 2 being the lower portion which attached to the axle.
Figure 2:
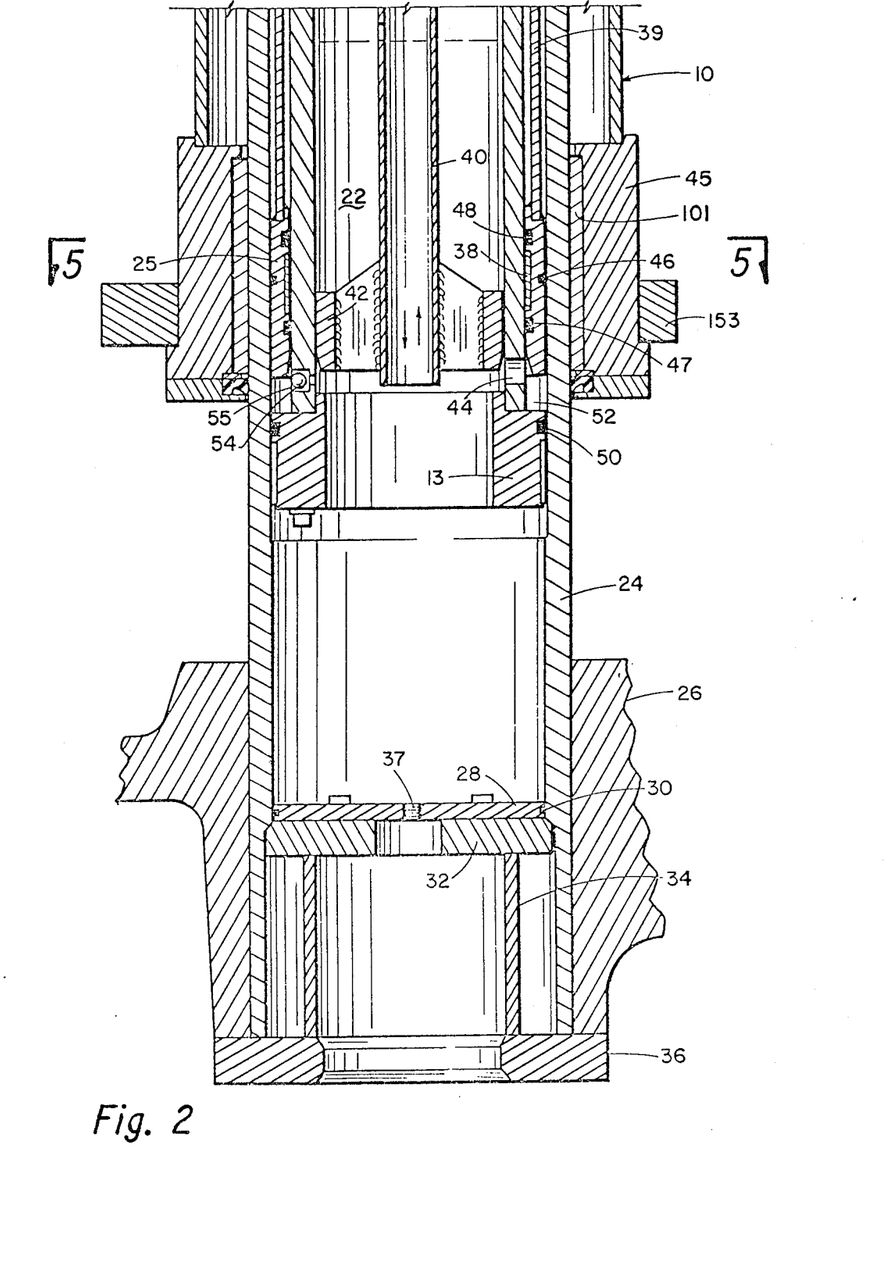
Figures 3, 4, 5:
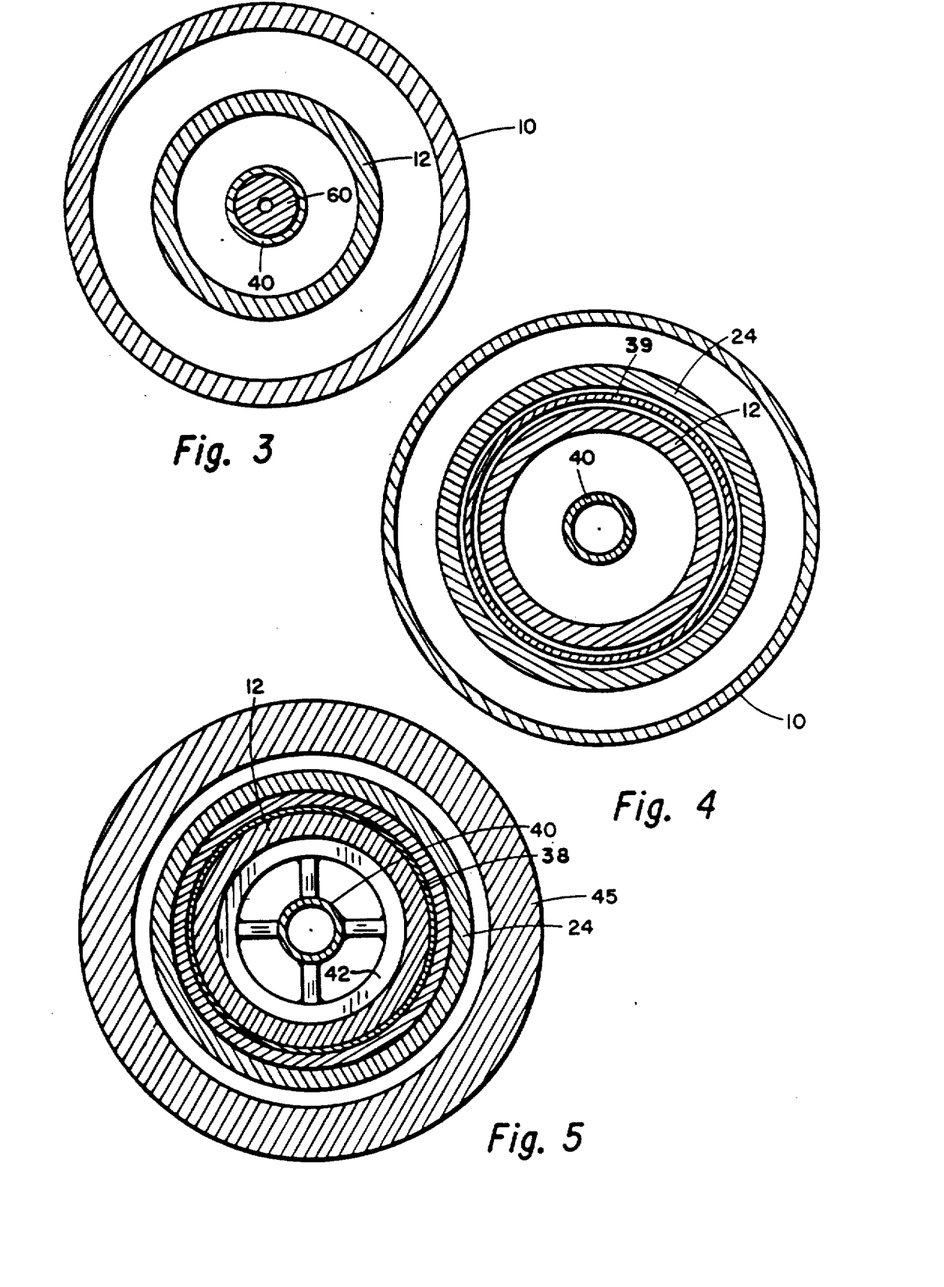
FIG. 3 is a view taken along the line 3—3 of FIG. 1.
FIG. 4 is a view taken along the line 4—4 of FIG. 1.
FIG. 5 is a view taken along the line 5—5 of FIG. 2.

Attention is now directed to the drawings and especially FIGS. 1 and 2 which show a strut suspension system in accordance with our invention. This system includes an upper section which is attached to the frame of a truck or vehicle and a lower portion which is attached to the axle of a vehicle. The upper portion and lower portion telescope with respect to each other and there is formed therein an annular cavity and a main cavity with port means therebetween and means for varying the cross sectional area of such port means from the exterior of the suspension system.

The upper section includes an outer tube 10 and a piston rod 12 with an annular space 11 therebetween. The outer tube is rigidly attached to the frame 153. The top of the outer tube 10 is enclosed by cap 14 which includes a piston rod support 16, a top cap 18, and bushing means 20 between the cap 18 and support 16. The piston rod 12 is attached to the lower portion of the piston rod support 16.

The lower portion includes a plunger tube 24 which extends up into annular space 11 between the outer tube 10 and the piston rod 12. The lower end of the plunger tube 24 is rigidly attached to axle casting 26. An annular cavity 52 is formed above piston head 13 which is attached to the lower end of the piston rod 12. Mounted above the piston head 13 and attached or made a part of the plunger tube 24 is a ring 25. Annular cavity 52 is below ring 25. There is provided between ring 25 and piston rod 12 a wear band 38, a wiper seal 48 and a lower seal 47 which is the main seal and is in a location where it is protected from any pollutants, dirt, etc. which may be in the atmosphere. If ring 25 is not made an integral part of the plunger tube 24 then there is provided a seal 46 so as to seal the upper end of annular cavity 52. If the ring 25 is an integral part of plunger tube 24 then seal 46 and support tube 39 are not needed. A seal 50 on piston head 13 seals with the inner wall of plunger tube 24 and thus forms a seal for the lower portion of annular cavity 52. A first port 44 provides fluid communication between annular cavity 52 and main cavity 22. Although only one relatively large port 44 is shown this port means may in fact be several smaller ports or sets of ports selectively spaced vertically through piston rod 12. That is, vertically with respect to the device when installed on a vehicle. A second passage or port 55 is provided with check valve 54. This check valve 54 permits free flow of fluid from the large cavity or main cavity 22 to the annular cavity 52. On the other hand the check valve does not permit flow of fluid from the annular cavity through port 55. Although port 55 with check valve 54 is drawn as a single port, there may in fact be several ports with check valves located circumferentially on the same vertical plane of the piston rod.

The lower end of plunger tube 24 is enclosed by a plate 28 having seal 30. Plate 28 is held in support by support plate 32 which is supported from end plate 36 by support 34. This can be done in any convenient manner. A drain or test port 37 is provided in plate 28 and is also provided with a plug to seal the lower end of the cavity 22.

Attention will now be directed toward that part of the invention which permits the effective area of port 44 to be varied from external of the suspension system. This includes an orifice metering ring 42 which is held in selected position with respect to port 44 by a slender hollow tube 40 which is connected to stem 60 which has threads 62. Tube 60 could be a solid rod. In such case there could be two passages through upper portion 16 of the piston rod 12. As shown in the drawing piston rod support 16 has a passage 64 therethrough which has threads 66 which engage threads 62 of the stem 60. Seals 68 are provided on the stem 60. The exterior portion 70 of stem member 60 is provided with opposite flattened sides so that a wrench may be easily used to rotate stem member 60. Rotating this member will raise or lower tube 40 which in turn is attached to orifice metering ring 42 which will raise or lower that ring and cover or uncover portions of the port means 44. This will be used to adjust the restriction of fluid flowing out of annular cavity 52 into the main cavity 22.

In operation, the lower portion of cavity 22 and annular cavity 52 are filled with oil and the upper portion of main cavity 22 is filled with a gas, preferably nitrogen, which can easily be done through channel 80 in stem member 60. There is thus a single oil/gas interface which may be at positions such as upper interface 17 and lower interface 19. The position of this interface will depend on the load, size of the suspension system, the charge of oil and gas using known principles. A cap means 82 is provided to permit flow of nitrogen in or out and/or to effectively close the upper end of channel 80. Channel 80 opens into the interior of tube 40 and has communication through port 41 as well as the lower end of tube 40 with the main cavity 22. Nitrogen will be injected under a selected pressure which will be dependent large upon the service to which it is to be put, that is, the loads which the suspension system is required to support. The nitrogen then becomes a gas spring.

When the load on the suspension system increases, the upper and lower portions will telescope together. This causes an increase in the size of the annular cavity 52 and oil will flow into the cavity through port means 44 and check valve 54. It is desired to have this flow in as rapidly as possible to prevent cavitation inside the annular cavity 52 which would have a detrimental effect on the oil and on the seal. The size of main cavity 22 is thus reduced and the pressure of the nitrogen is increased sufficiently to support the increased suspension load.

When the load is reduced on the suspension system, the upper portion and the lower portion will attempt to elongate to increase the volume of cavity 22 and decrease the volume of annular cavity 52. The oil then will flow out of the annular cavity 52. It is the control of this flow which provides the dampening effect. The check valve 54 does not permit any flow of fluid through port 55 from annular cavity 52 to main cavity 22. However, the flow is then only through port means 44. The desired size of the port 44 will vary depending upon various loading conditions anticipated to be encountered. It is essentially impossible to accurately calculate the size that this opening should be. Therefore, we use an externally adjustable metering ring 42. We adjust the position of metering ring 42 to leave open only that portion of port means 44 which we anticipate will be in the neighborhood of giving the desired operating characteristics. We then apply loading forces to the strut system which will be comparable to that anticipated for its use and then determine the dampening characteristics. If the dampening characteristics are not correct we readjust the position of orifice meter ring 42 by rotation of stem member 60 externally of the strut suspension system. This is very easily done without dismantling the strut system. We continue this adjustment and testing until we get the desired dampening characteristic. We can then lock the stem member 60 in the proper position by applying lock nuts or any other well known means.

To operate properly the piston rod 12 must be axially aligned with the axis of the plunger tube 24. This permits the piston head 13 and piston rod 12 to move telescopically with respect to the plunger tube 24 without causing any binding while maintaining excellent sealing. However, upper bushing 100 and lower bushing 101 between the outer tube and the plunger tube will wear and this causes misalignment between the piston rod and plunger tube 24. For example, the bushing 101 may become excessively worn. This excessive wear will normally occur on one side and that side would be the side adjacent where the side of which the plunger tube 24 is attached to the axle on the side where the wheel is attached. This uneven wear will cause a misalignment of the piston rod which will tend to bind in its up and down movements and it will cause wear and eventually leakage past the main seal 47. Stated differently, the high load where the tire and axle are will create wear on the outboard side of the lower bearing 101 and the inboard side of the upper bearing 100. When this uneven wear occurs the piston rod will tend to cock in the bore of the plunger tube 24. That is, the longitudinal axis of the piston rod will be at an angle with the longitudinal axis of the plunger tube 24. If the upper end of the piston rod 12 is rigidly secured to the top of the outer tube it cannot move to accommodate for this change in geometry, then obviously that misalignment would help create binding on the bushings and attendant high wear. This would eventually cause the seals to leak and eventually fail. To compensate for that misalignment we have provided a self-aligning feature in a cushion pad assembly which we use to connect the piston rod 12 to the outer tube 10 as shown in FIGS. 5, 6, 7 and 8. Thus, as the bushings between the plunger tube and outer tube wear and the plunger tube cocks slightly in the bore of the outer tube, the upper end of the piston rod can translate to one side because of the elastomeric pads and the clearance of the steel components as will be seen.

Figure 6:
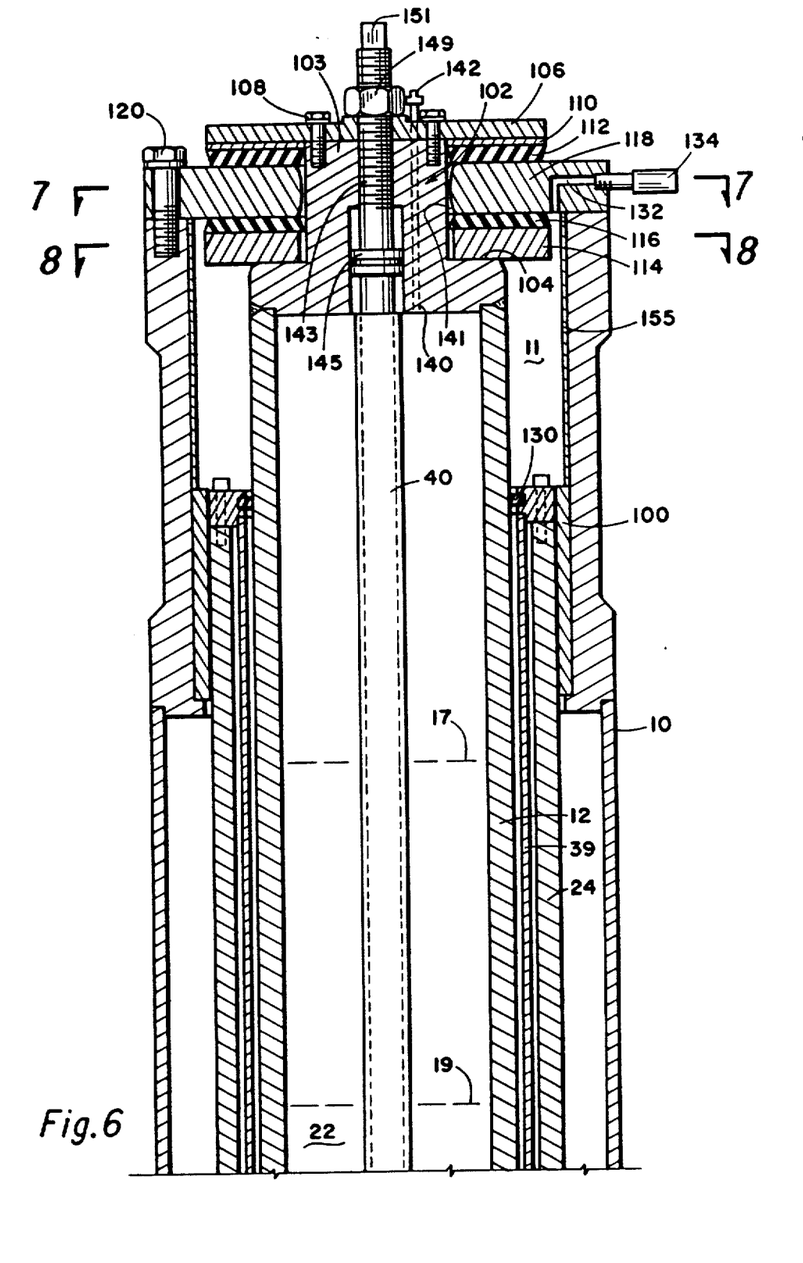
FIG. 6 is similar to FIG. 1 except there is shown a cushion pad assembly which connects the upper end of the piston rod to the upper end of the outer tube. The structure of FIG. 6 connects to the lower portion of the device shown in FIG. 2 similarly as to how the device shown in FIG. 1 does.
Figure 7:
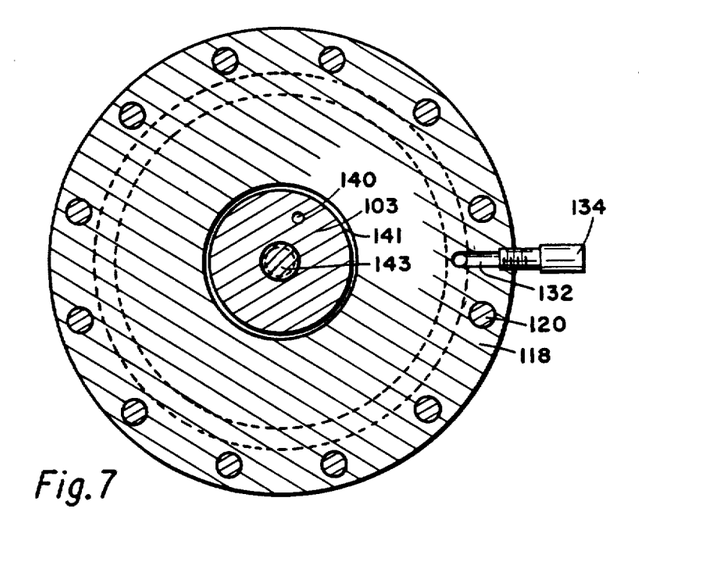
FIG. 7 is a view taken along the line 7—7 of FIG. 6.
Figure 8:
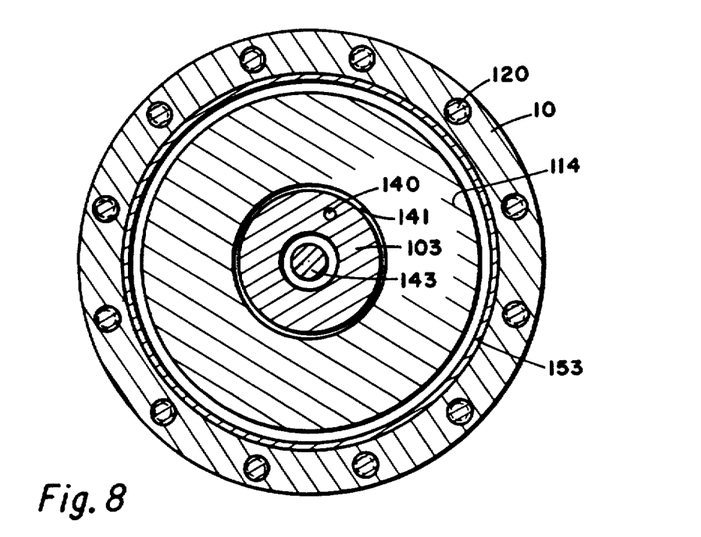
FIG. 8 is a view taken along the line 8—8 of FIG. 6.

Our cushion pad assembly includes a top 102 of the piston rod which has a neck 103 and an annular shoulder 104. Mounted on the top 102 is top plate 106 which is bolted thereto by bolts 108. A steel annular washer shaped plate 110 has secured thereto an annular shape cushion pad 112 which is preferably made of urethane. A second annular washer shaped plate 114 rests on shoulder 104 of the top of the piston rod. Bonded to plate 114 is a second cushion pad 116 which is similar to pad 112. Steel plates 110 and 114 and cushion pads 112 and 116 are typically washer shaped. The urethane pads 112 and 116 are typically bonded to one side of steel plate 110 and steel plate 114, respectively.

A relatively thick annular plate 118 is attached to outer tube 10 by a plurality of bolts 120. This thick annular member sits between the cushion pads 112 and 116. There is a clearance 141 between the inner diameter of the cylindrical portion of top 102 of the piston rod and the inner diameter of thick annular plate 118. This clearance is typically one quarter inch in a strut in which the outer diameter of annular member 118 is about 13¼ inches. In other words the inner diameter of hole or passage in plate 118 is typically about ½ inch greater than the diameter of neck 103. This is adequate to permit lateral translation of the piston rod 12 to maintain alignment within the plunger tube 24 when wear occurs in the bushings. When assembled and in the unloaded position, cushion pads 112 and 116 rest firmly against the upper and lower side respectively of the annular member 118. When the load of a vehicle is added, the cushion pad 116 will compress.

We thus have a self-aligning structural feature. As the plunger tube 24 bushings 100 and 101 wear, the plunger tube cocks slightly in the bore of the outer tube. However, the upper end of the piston tube can translate (move laterally) to one side as required because of the clearance between the bore of annular steel plate 118 and steel neck 102 of the top of the piston rod 12 to accommodate the misalignment.

The slender tube 40 is connected to solid rod 143 which extends through neck 103 to the exterior where nut 149 and head 151 are attached. Head 151 has square faces to accommodate a wrench when used for raising or lowering tube 40.

A wear seal 130 is placed between the top end of plunger tube 24 and the outer wall of piston rod 12. That part of space 11 above the plunger tube 24 and inside liner 155 of the outer tube is connected to the atmosphere through conduit 132 which is connected to an air filter 134. This is to insure that the air in space 11 will not be under high pressure but will always be clean.

This aids in extending the life of wear seal 130. With the sealing arrangements and structure we give excellent protection to the main seal which is the lower seal 47.

Also, slender tube 40 is connected to rod 143 so that port size adjustments can be made similar to that of FIG. 1.

A gas loading conduit 140 is provided through neck 102 of the top of the piston rod. The top of conduit 140 is provided with a loading and unloading valve 142 through which fluids are added to the strut.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A suspension system for use on a vehicle between an axle and a load carrying body which comprises:

a cylindrical housing with a closed end attached rigidly to said axle;

an outer housing slidable over said cylindrical housing and attached rigidly to said body;

a hollow piston rod attached to said outer housing and extending in sliding engagement with the inner side of said cylindrical housing and forming an annular cavity between said cylindrical housing and said piston rod, said piston rod having a passage with a port area between said annular cavity and the interior of said piston rod;

oil in said annular cavity and a portion of said interior of said piston rod;

gas in that portion of the interior of said piston rod not occupied by said oil;

a second port area between said annular cavity and the interior of said piston rod and including a check valve in said second port area to permit the flow of fluid through said second port area only in a direction from the interior of said piston rod to said annular cavity;

adjustable means operable from exterior of said housing to close off a selected portion of said port area including a cap on the end of said outer housing with a threaded hole therethrough, a hollow orifice metering ring closely fitting the interior of said piston rod, a stem member having threads engaging said threaded hole and extending through said cap so that said stem member may be rotated from the exterior of the outer housing, a slender tubular member connecting said orifice metering ring and said stem member whereby rotation of said stem member exterior of said outer housing adjusts the relative position between said orifice metering ring and said port area;

a port extending through the wall of said slender tubular member.

2. A suspension system as defined in claim 1 including:

a cushion pad assembly having at least one resilient pad for attaching the upper end of said piston rod to the first end of said outer tube and located therebetween such that the upper end of said piston rod and upper end of said outer tube may have translation movement relative to each other.

* * * * *

UNITED STATES PATENT AND TRADEMARK OFFICE
CERTIFICATE OF CORRECTION

PATENT NO. : 4,863,147

DATED : Sep. 5, 1989

INVENTOR(S) : Loeber et al.

It is certified that error appears in the above—identified patent and that said Letters Patent is hereby corrected as shown below:

On the title page, last line, change "2 Drawing Sheets" to --5 Drawing Sheets--

The sheets of drawings consisting of Figures 3-8 should be added as per attached sheets.

Signed and Sealed this

Twenty-fourth Day of July, 1990

Attest:

HARRY F. MANBECK, JR.

*Attesting Officer*     *Commissioner of Patents and Trademarks*